United States Patent [15] 3,670,444
Dieterich [45] June 20, 1972

[54] FOLDING HAND TROUT NET

[72] Inventor: Frank L. Dieterich, Los Angeles, Calif.

[73] Assignee: James A. Barnett, Los Angeles, Calif. ; a part interest

[22] Filed: July 13, 1970

[21] Appl. No.: 54,375

[52] U.S. Cl. ..................................................43/12
[51] Int. Cl. ......................................................A01k 77/00
[58] Field of Search ..................................................43/12, 11

[56] References Cited

UNITED STATES PATENTS

| | | | |
|---|---|---|---|
| 2,040,714 | 5/1936 | Smith | 43/12 |
| 2,727,328 | 12/1955 | Dunton | 43/12 |
| 737,428 | 8/1903 | Lindsey et al. | 43/12 |
| 628,958 | 7/1899 | Pape | 43/12 UX |
| 440,568 | 11/1890 | Hebard | 43/12 |
| 2,549,573 | 4/1951 | Clark | 287/98 X |
| 1,743,241 | 1/1930 | Schmidt | 287/98 UX |

Primary Examiner—Samuel Koren
Assistant Examiner—J. F. Pitrelli
Attorney—Fulwider, Patton, Rieber, Lee & Utecht

[57] ABSTRACT

A folding hand fish landing net, including a handle and frame arms, pivotedly connected together and to the handle so as to be foldable at opposite sides of the handle into a compact unit about which the bottom of the net may be wrapped for easy carrying and storage. The frame arms open out into a frame loop to which the top of the net is attached. The handle is provided with a spring-biased, manually retractable locking sleeve on its forward end, and the frame arms pivoted to the handle are disposed in slots in the forward end thereof when the frame is extended, the sleeve being automatically moved by its spring past the arm pivots into locking position.

13 Claims, 4 Drawing Figures

PATENTED JUN 20 1972

3,670,444

INVENTOR.
FRANK L. DIETERICH
BY Fulwider, Patton, Rieber
Lee, and Utecht
ATTORNEYS 3,670,444

FOLDING HAND TROUT NET

BACKGROUND OF THE INVENTION

1. This invention relates to the field of folding hand fish landing nets which may be collapsed into a carrying and storage unit substantially smaller than the length of the net frame and handle.

2. Folding hand fish nets employing net frames having a plurality of pivoted arms and moving to collapsed position by the center pivot moving inwardly are known in the art. (U.S. Pat. Nos. DeSaxe 10,794, Hebard 440,568, Larzelere 1,886,559 and Hexidal 2,556,650). Folded net frames which may be opened to extended position by one hand operation and including spring-biased extension are also old in the art. (U.S. Pat. No. Henson 2,619,755). It is also known in the art to provide a folding fish net frame which is locked in extended position by a screw-threaded collar.

Thus, various features similar to those of the present invention may be found individually in the prior art, but no disclosure combines these features in accordance with this invention in the new combinations recited in the appended claims.

SUMMARY OF THE INVENTION

The folding hand fish landing net of the present invention, while collapsable into a carrying unit of compact size, may be extended into operating position by simple, one hand operation assisted by a biasing spring which also moves a locking sleeve to prevent involuntary collapse of the net frame. The sleeve may be readily manually retracted for collapsing movement of the frame about the handle. With the back arms of the frame pivoted to the handle within slots in the opposite sides thereof in which the arms are disposed in extended position, secure locking is secured by positioning the sliding sleeve at the outside of the slots and arms to prevent the latter pivoting relative to the handle until the locking sleeve is manually moved to release position against its spring bias.

In unfolding the arms, the spring bias, which automatically moves the sleeve into locking position, is applied through the end of the sleeve to the arms pivoted in the handle so as to assist movement of all the frame arms into their extended position. Such movement is readily initiated by forward snapping movement of the handle and folded frame, whereby momentum and the spring bias move the frame arms into their extended positions.

The net frame is made up of four arms, with a pair of rear arms pivoted in the forward end of the handle as above described, with a pair of forward arms pivoted together at their forward ends and with the rear and forward arms pivoted together at the opposite sides of the frame.

Each pair of forward and rear arms tends to "scissors" together adjacent their interconnecting pivots and, to prevent damage to the net strands, washers are disposed between the forward and the rear arms at their joining pivots. These washers have a diameter large enough to prevent the net strands from entering between the arms adjacent the pivots, where the "scissoring" action might operate to cut the strands. Also the washers have a thickness not substantially less than the diameter of the net strands to provide such a spacing between the arms at their pivots to further prevent cutting of the net strands.

The frame arms are preferably made of stainless steel for strength and corrosion resistance, as is also the spring biasing the locking sleeve. The locking sleeve and handle may be made of anodized aluminum for lightness and resistance to corrosion.

The folding hand fish landing net of this invention may be extended by one hand while the other is holding a fishing rod or is otherwise occupied. If the net is wound about the handle and collapsed frame, it is unwound by swinging the handle and thereafter the handle is snapped forwardly, whereupon the frame arms are moved into their extended positions by their momentum and the bias on the locking sleeve. The sleeve moves forwardly under its spring bias to securely lock the frame in its extended position. In folding the frame, the locking sleeve is manually retracted against its spring bias and the frame moved into collapsed position on opposite sides of the handle, during which action cutting of the net strands at the pivoted connection between the frame arms by "scissoring," is prevented. The net may be suspended from and secured against loss while being used, by a lanyard loop of resilient cord which may be placed about the users neck.

DESCRIPTION OF THE PREFERRED EMBODIMENT

Figure 1:
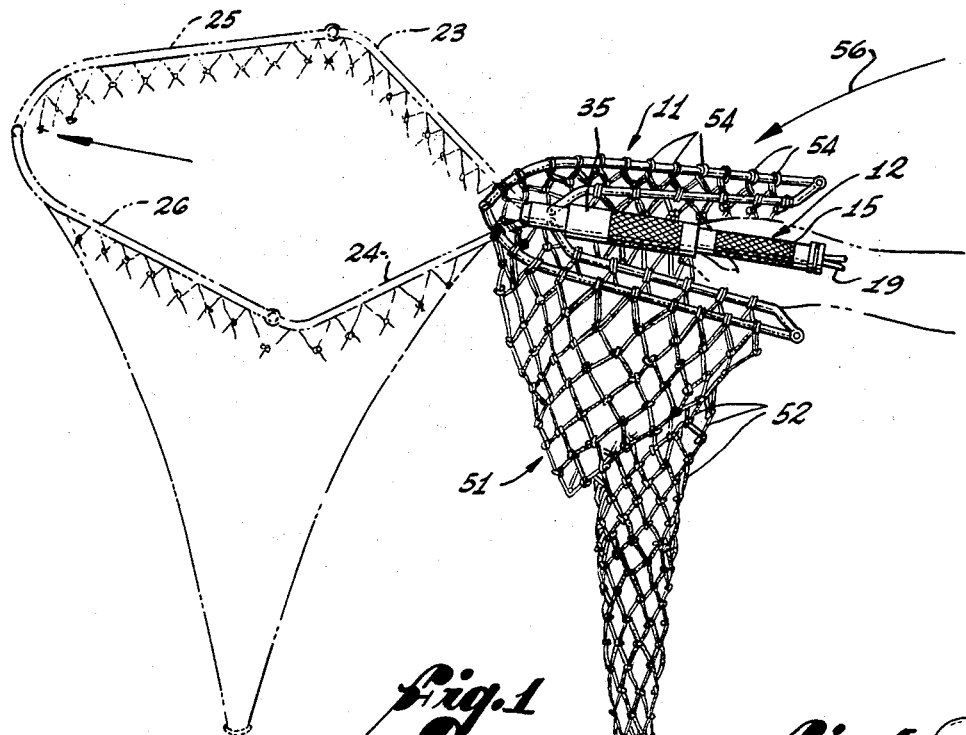
FIG. 1 is an elevational view with the folded net frame held vertically in the position in which it is more easily snapped opened, the latter position being shown in broken lines.

The folding hand fish landing net 11 of the present invention comprises a handle 12 and folding net frame 13. The handle 12 comprises a tube 14 having a knurled hand grip surface 15. The tube 14 is threaded at 16 at its rear end to mount a threaded plug 17 having an opening 18 therethrough through which extends an elastic cord lanyard 19. The inner ends of lanyard 19 pass through a washer 21 and are secured by a pressed clamp 22 so that the lanyard 19 is securely fastened to the handle 12 and cannot be withdrawn therefrom without unscrewing the plug 17.

Figure 2:
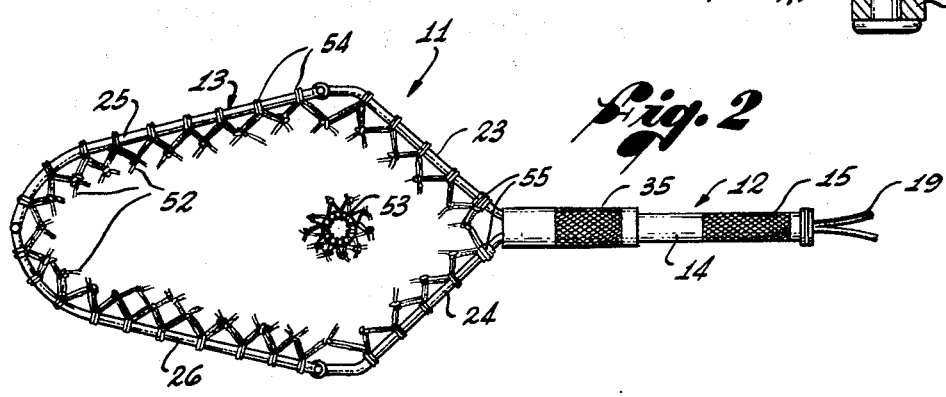
FIG. 2 is a plan view of the open net according to the present invention.

The net frame 13 is comprised of a pair of rear arms 23 and 24 and a pair of forward arms 25 and 26, shown in extended position in the full lines of FIG. 2 and the dotted lines of FIG. 1. In the forward end of the sleeve 14 is press-fit a forward end plug 27 and at opposite sides of the forward end of the plug 27 are cut a pair of notches or slots 28 and 29. The rear arms 23 and 24 have angularly formed rear portions 31 and 32 whose ends are pivotedly mounted within the slots 28 and 29 at 33 and 34, respectively. The angle formed by the rear portions 31 and 32 produces diverging frame arms forwardly of the handle upon which the net is mounted as shown in FIG. 2, the portions 31 and 32 being received in the slots 28 and 29, respectively, when the frame 13 is extended.

Upon a forward end of the handle tube 14 is mounted a reciprocalable sleeve 35 having a forward spring retaining flange 36. A coiled compression spring 37 is mounted between the flange 36 and the end of the tube 14 to bias the sleeve 35 forwardly from the positions of FIGS. 1 and 3 into its forward locking position of FIG. 2 where it is opposite the portions 31 and 32 of the rear arms 23 and 24 which are thereby locked within the slots 28 and 29.

Figure 4:
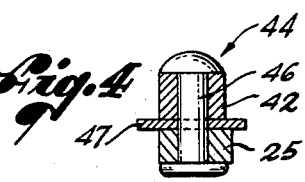
FIG. 4 is a detailed sectional view through a side pivot between a forward and a rear arm.

The forward arms 25 and 26 of the frame 13 have their forward ends curved at 38 and 39 to provide end curvature to net frame and the ends of the portions 38 and 39 are pivotedly interconnected at 41. The forward ends of the rear arms 23 and 24 are angularly disposed at 42 and 43 to shape the frame loop and the forward ends of the portions 42 and 43 and the rear ends of the arms 25 and 26 are pivotedly interconnected at 44 and 45, respectively. The pivotal interconnections 44 and 45 as shown in an enlarged sectional detail in FIG. 4 where the rear end of the arm 25 and the angle portion 42 of the arm 23 are interconnected by a rivet 46 about whose axes they are rotatable. Between the pivoted arms are mounted washers 47 which have diameters sufficiently large to prevent the net strands from entering the space between the arms 25 and 26 and the angular portions 42 and 43 close to the pivots which might otherwise subject the strands to "scissoring" action as the frame arms are collapsed from the position of FIG. 2 into that of FIGS. 1 and 3. Also the washers 47 have a thickness at least as great as the diameter of the net strands so that if the strands are caught between the pivoted arms they will not be cut. The diameters of the washers prevent the net strands from coming close to the pivots parallel to the pivot axes while the thickness of the washers separates the arms at the pivots so that net strands may enter between the arms in positions generally at right angles to the pivot axes without being cut.

The net proper is shown at 51 having individual strands 52 knotted together in known manners to form a generally diamond mesh and interconnected at their bottom ends by a metal ring 53 about which strands are looped. The top of the net comprises a double knotted cord which is looped about the frame 13, as at 54, before assembly of the frame arms to the handle at the pivots 33, 34.

To prevent the net loop adjacent the net handle 12 from being caught either between the portions 31, 32 and the notches 28 and 29, or within the sleeve 35, the net top loops are cemented or otherwise attached adjacent the back ends of the arms 23, 24 and forwardly of the handle at 55.

The fish landing net of this invention is shown in folded condition in full lines in FIG. 1 and will normally be carried with the net proper 51 wrapped around the handle 12 and the collapsed or folded frame arms. This makes a compact package for transportation or storage. The folded net may be carried while fishing either in a pocket of the angler or suspended from the lanyard 19 which may be passed around the angler's neck. The lanyard may remain about the neck while the extended net is being used to land a fish to avoid danger of loss by having the net slip from the hand. When the plug 17 is screwed out of the sleeve 14, an extension rod may be screwed into the sleeve at 16 so that the handle is given a greater length.

The folded net with the net proper 51 unwrapped from the handle and folded frame arms is shown in full lines in FIG. 1. The net proper may be readily unwound by a swinging or rotating movement of the handle and arms, and the other extending manipulations as well may be carried out by a single hand of the angler while his other hand is holding a fishing rod. As viewed in full lines in FIG. 1, the handle is held with the folded frame arms in a generally vertical plane and the handle is given a forward snapping movement as indicated by the arrow 56. When the forward and downward motion of the handle is stopped, the momentum of the frame arms 23 – 26 and the bias of the spring 37 exerted from the end of sleeve 35 upon the angle portions 31, 32 cooperate to produce a forward extension movement of the arms 23 – 26 into the positions shown in dotted lines in FIG. 1. It will be seen that the forward end of the sleeve 35 engages the arms 23, 24 of the frame at all times, both in the folded position of full lines FIG. 1 and FIG. 3 and in the extended position of FIG. 2. The force exerted by the spring 37 therefore tends to rotate the arms 23 and 24 forwardly from collapsed into extended positions, which force is supplemented by the momentum of the arms given to them by the forward snap movement of the handle indicated by the arrow 56 in FIG. 1. It will be further noted in FIG. 3 that the forward end of the sleeve 35 is chamfered internally so as to be substantially parallel to the forwardly inclined major portions of the arms 23 and 24 in the extended position of FIG. 2.

Figure 3:
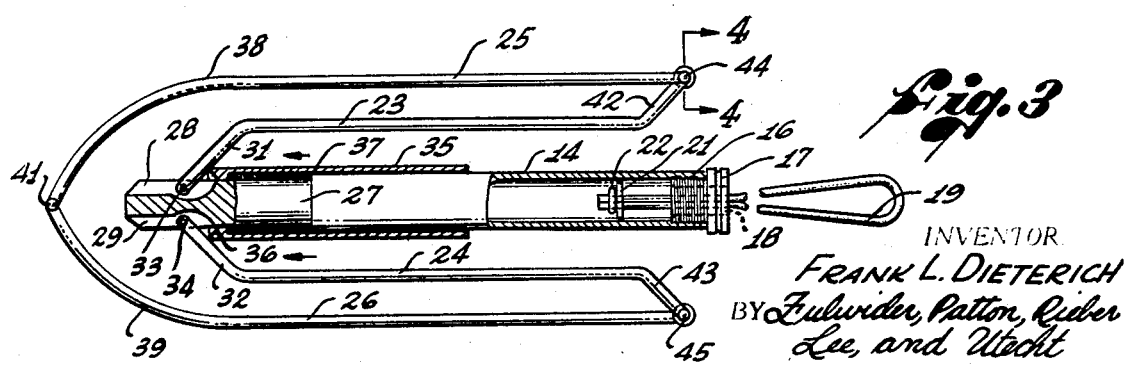
FIG. 3 is a view partly in horizontal section and partly in plan of the folded frame with the net removed.

To collapse the net frame 13 from the extended position of FIG. 2 into the folded full line position of FIG. 1, the sleeve 35 is manually retracted into substantially the position of FIG. 3 against the bias of the spring 37 and the frame arms are collapsed by moving the pivot point 41 toward the handle whereupon the arms 23 – 26 readily fall into the collapsed position of FIGS. 1 and 3. After being so folded the arms 23 – 26 may be moved toward the handle 12 so that the arms 23 and 24 actually contact the tube 14 whereupon the net proper 51 may be wrapped around the handle and folded arms in a minimum size configuration for transport and storage.

While a certain preferred embodiment of the invention has been specifically illustrated and described it will be understood that the invention is not limited thereto as many variations will be apparent to those skilled in the art and the invention is to be given its broadest interpretation within the terms of the following claims.

I claim:

1. A folding hand fish landing net comprising:
a handle;
notches in said handle on opposite sides of the forward end thereof;
a first pair of arms pivotedly mounted in said notches and swingable into an extended position where the back ends of said arms are substantially enclosed in said notches;
a second pair of arms;
means pivotedly connecting the adjacent ends of said pairs of arms together to form pivotal joints;
means pivotedly connecting the forward ends of said second pair of arms together, said pairs of arms when extended forming a frame loop;
a pocket-like net suspended from the frame loop of said arms, said arms collapsing into folded positions on opposite sides of the handle and closely adjacent thereto;
a sleeve slidably mounted on the forward end of the handle;
means biasing said sleeve forwardly relative to the handle into a limited position opposite said notches so that it positively locks the first pair of arms therein in extended position;
said sleeve being manually moveable backwardly to clear said first pair of arms for collapsing movement of the arms into their folded positions alongside the handle; and
the top loops of the net at the back ends of said first pair of arms are fixedly secured to the arms at positions located beyond said notches when the arms are extended so that the net strands will not be cut by being caught between the arms and the notches as the arms are extended.

2. The fish landing net defined in claim 1 in which said arms are readily moveable from collapsed into extended, loop-forming position by forward snap movement of the handle by a single hand manipulation, said arms extending under the forces of momentum and the means biasing the sleeve forwardly.

3. The fish landing net defined in claim 2 in which said sleeve is automatically moved into forward locking position opposite the notches by its biasing means when the rear portions of said first pair of arms enter said notches, whereby to positively lock all of the arms in loop forming positions.

4. The fish landing net defined in claim 1 including:
a elastic cord lanyard;
means removeably attaching said lanyard cord to the back end of said handle, said attachment means when removed permitting an extension rod to be mounted to the back end of the handle.

5. The fish landing net defined in claim 1 including:
washers disposed between the adjacent ends of said first and second pairs of arms at their pivotal connections, said washers having a diameter larger than the diameter of each pivotal joint to prevent the net strands entering the spaces between the arms immediately adjacent the pivots in positions generally parallel to the pivot axes, thereby preventing cutting of the strands by shearing.

6. The fish landing net defined in claim 5 in which said washers have a thickness at least as great as the diameter of said net strands to separate the arms and prevent the strands being cut when they enter between the arms in positions generally at right angles to the pivot axes.

7. The fish landing net defined in claim 1 in which the opposite ends of said first pair of arms are angled in opposite directions, the rear angled portions being received in said notches to be locked therein by said sleeve, and the forward angled portions giving a smoother shape to the sides of the frame loop.

8. A folding hand fish landing net comprising:
a handle;
notches in said handle on opposite sides of the forward end thereof;
a first pair of arms pivotedly mounted in said notches and swingable into an extended position where the back ends of said arms are substantially enclosed in said notches;
a second pair of arms;

means pivotedly connecting the adjacent ends of said pairs of arms together to form pivotal joints;

means pivotedly connecting the forward ends of said second pair of arms together, said pairs of arms when extended forming a frame loop;

a pocket-like net suspended from the frame loop of said arms, said arms collapsing into folded positions on opposite sides of the handle and closely adjacent thereto;

a sleeve slidably mounted on the forward end of the handle;

means biasing said sleeve forwardly relative to the handle into a limited position opposite said notches so that it positively locks the first pair of arms therein in extended position;

said sleeve being manually moveable backwardly to clear said first pair of arms for collapsing movement of the arms into their folded positions alongside the handle; and washers disposed between the adjacent ends of said first and second pairs of arms at their pivotal connections, said washers having a diameter larger than the diameter of each pivotal joint to prevent the net strands entering the spaces between the arms immediately adjacent the pivots in positions generally parallel to the pivot axes, thereby preventing cutting of the strands by shearing.

9. The fish landing net defined in claim 8 in which said washers have a thickness at least as great as the diameter of said net strands to separate the arms and prevent the strands being cut when they enter between the arms in positions generally at right angles to the pivot axes.

10. The fish landing net defined in claim 8 in which said arms are readily moveable from collapsed into extended, loop-forming position by forward snap movement of the handle by a single hand manipulation, said arms extending under the forces of momentum and the means biasing the sleeve forwardly.

11. The fish landing net defined in claim 10 in which said sleeve is automatically moved into forward locking position opposite the notches by its biasing means when the rear portions of said first pair of arms enter said notches, whereby to positively lock all of the arms in loop forming positions.

12. The fish landing net defined in claim 8 including:

an elastic cord lanyard;

means removeably attaching said lanyard cord to the back end of said handle, said attachment means when removed permitting an extension rod to be mounted to the back end of the handle.

13. The fish landing net defined in claim 8 in which the opposite ends of said first pair of arms are angled in opposite directions, the rear angled portions being received in said notches to be locked therein by said sleeve, and the forward angled portions giving a smoother shape to the sides of the frame loop.

* * * * *